April 19, 1938.    W. J. OESTERLEIN    2,114,907
MOTOR CONSTRUCTION
Filed May 2, 1935    7 Sheets-Sheet 1
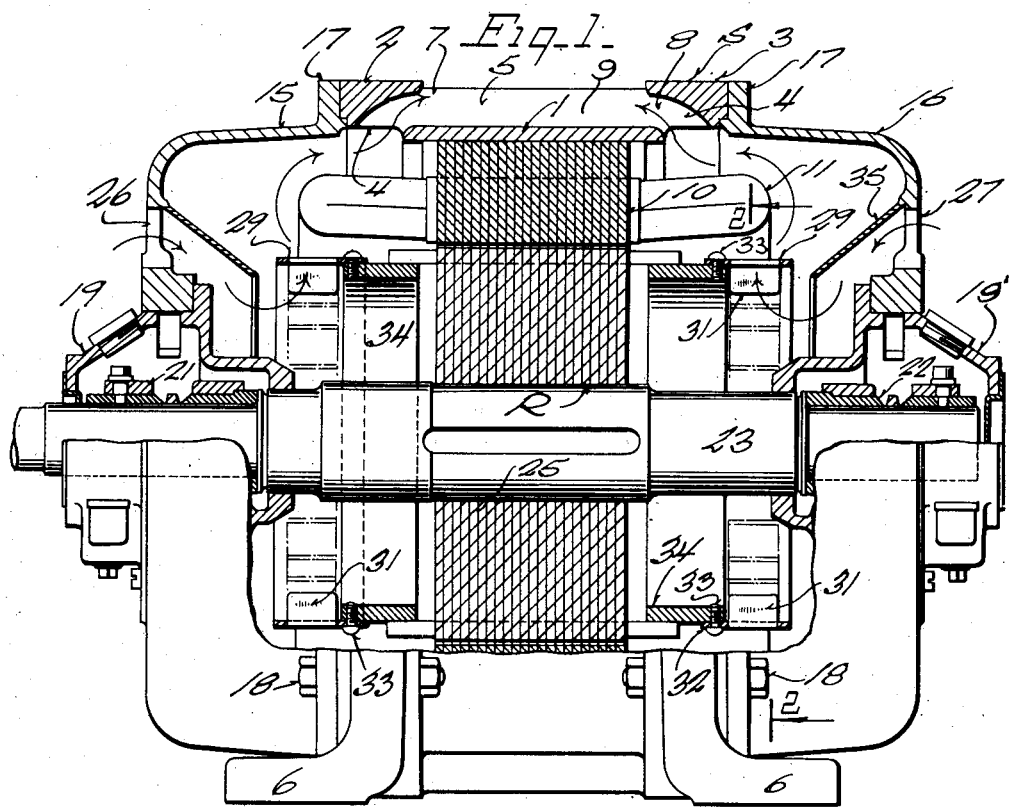
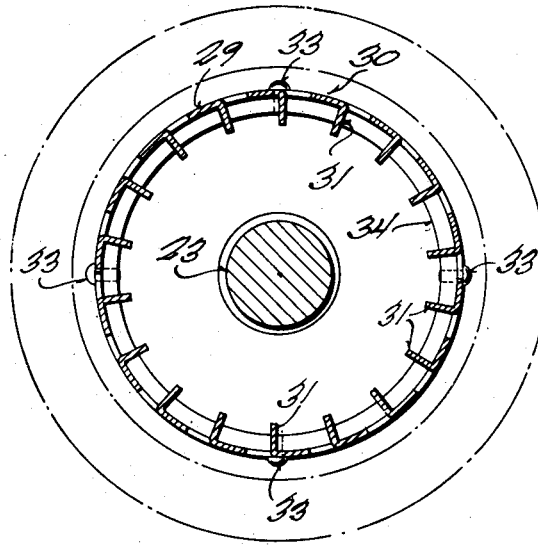
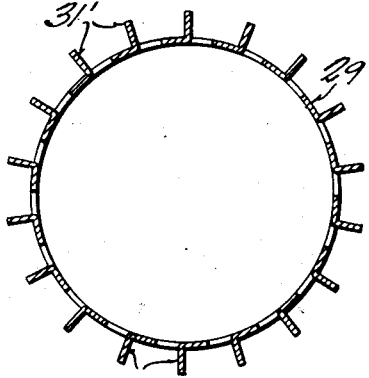
INVENTOR.
William J. Oesterlein
BY
Bottum, Hudnall, Lesher,
McNamara & Michael
ATTORNEYS

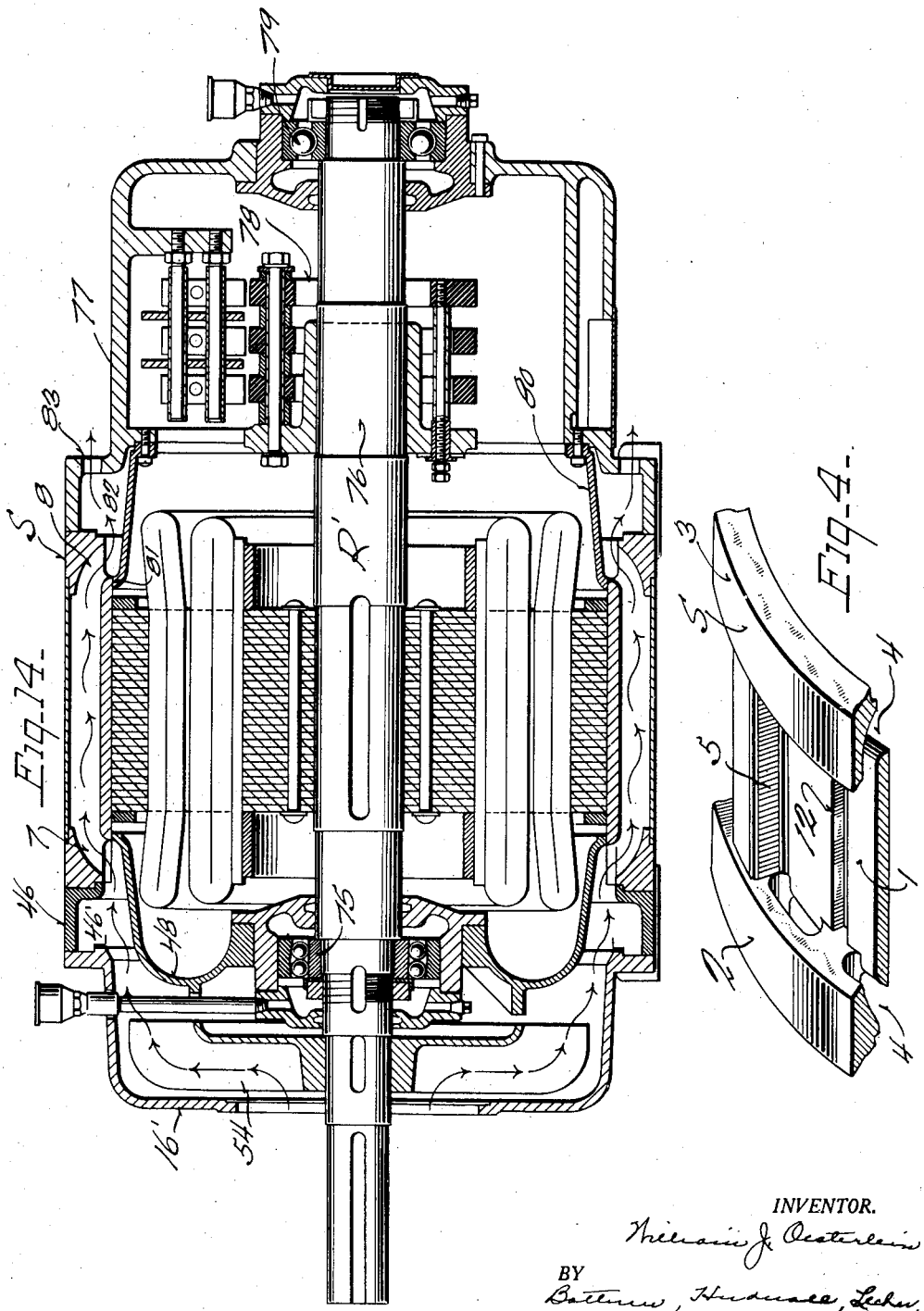

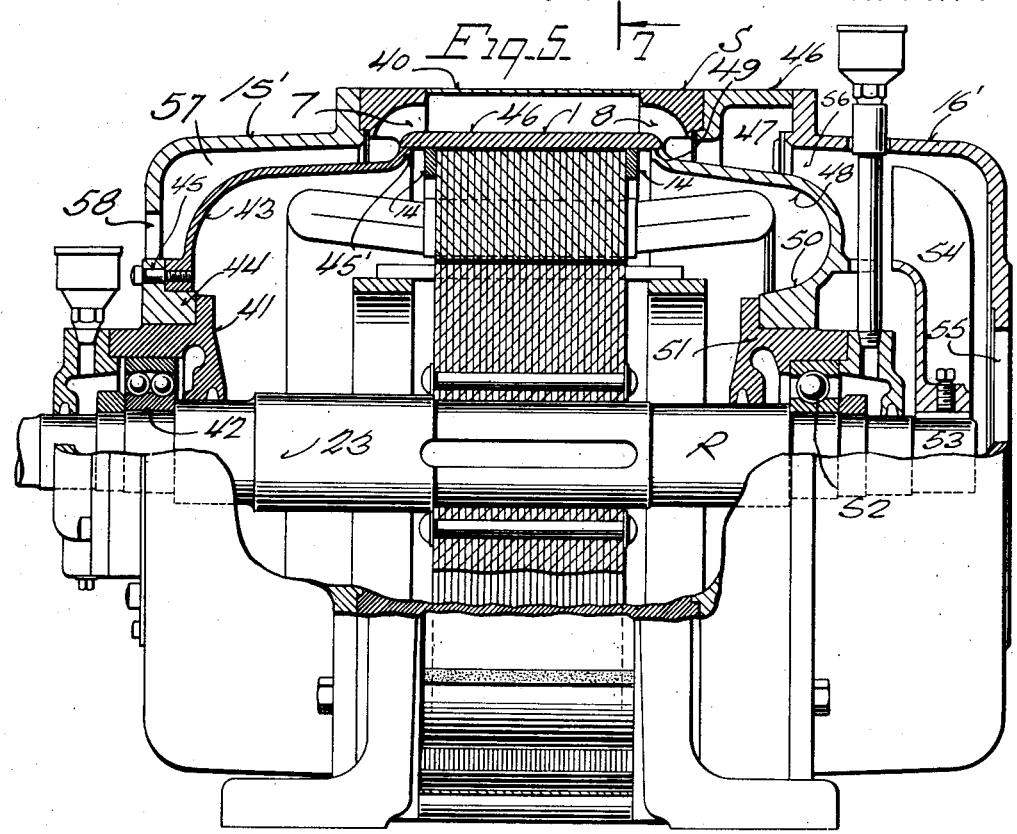
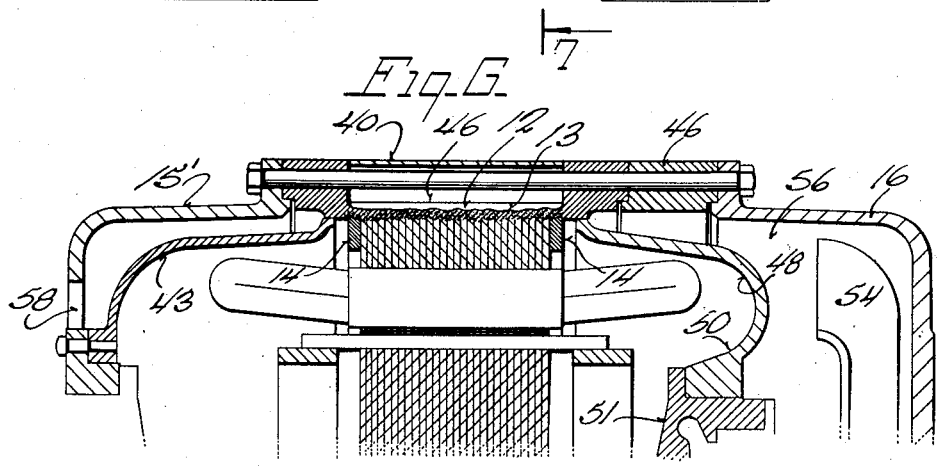

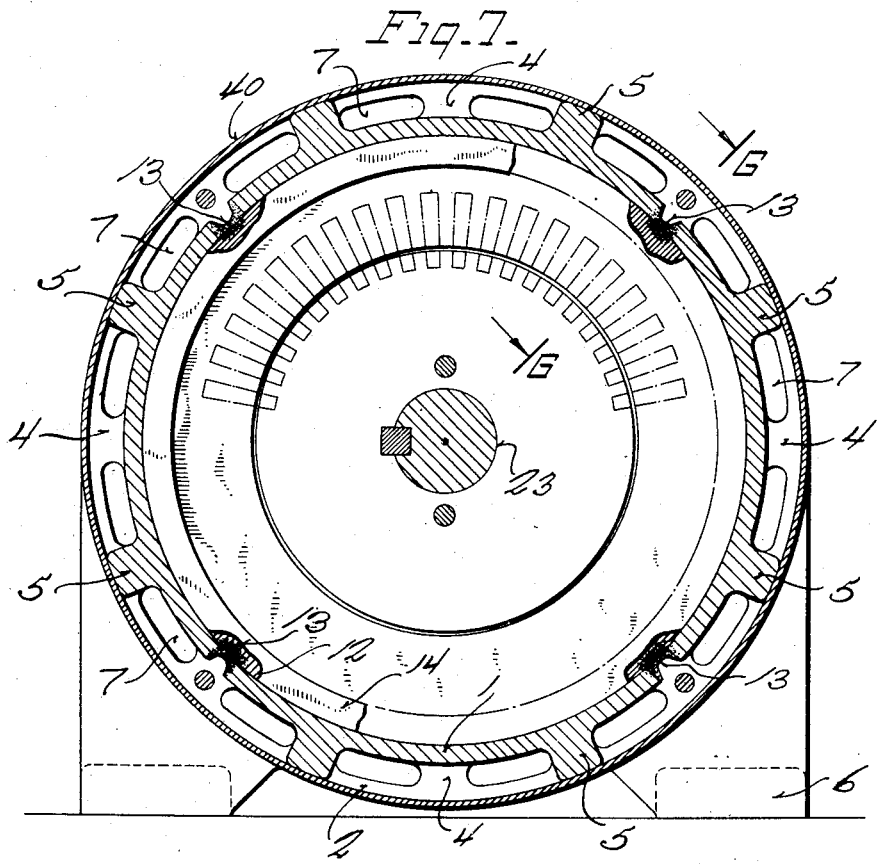
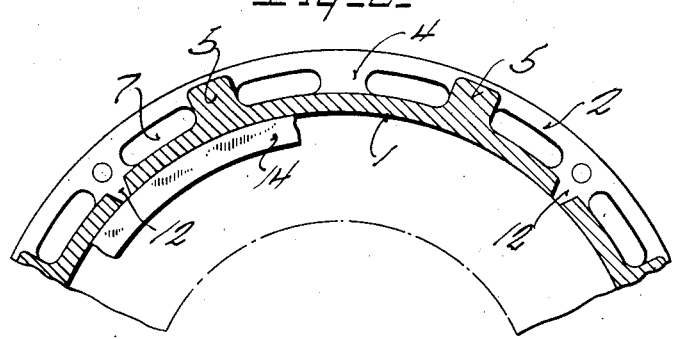
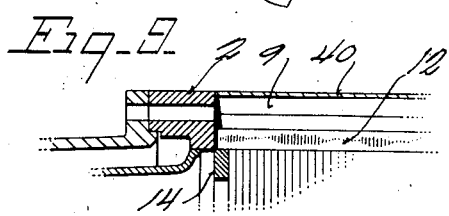

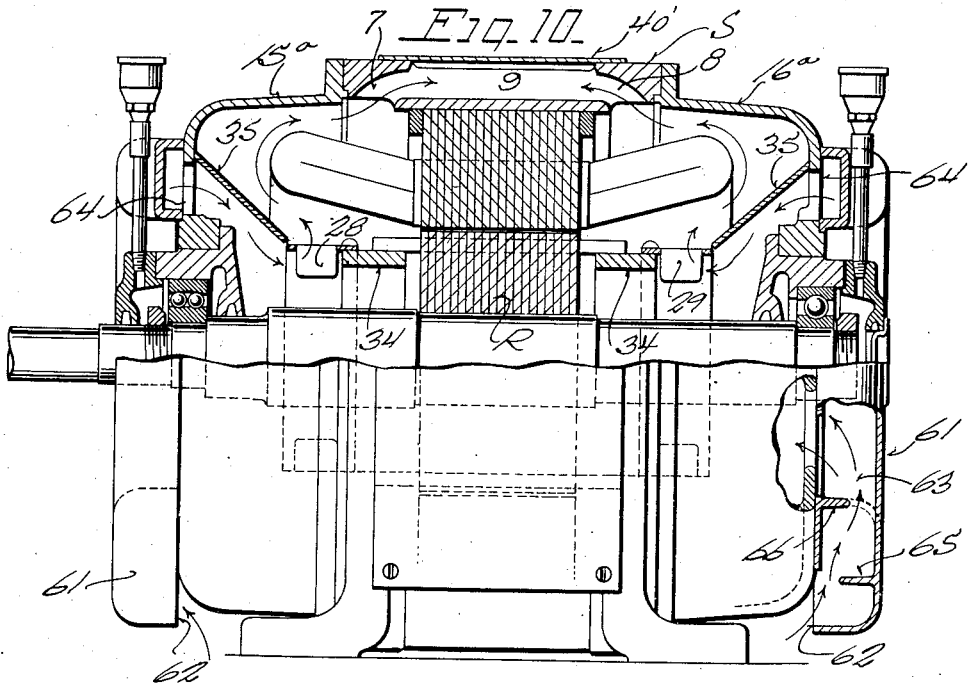
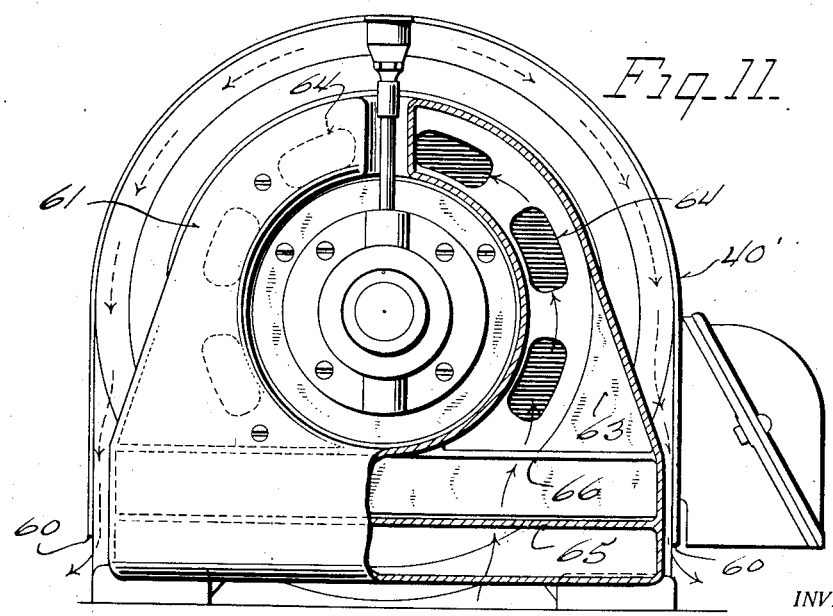

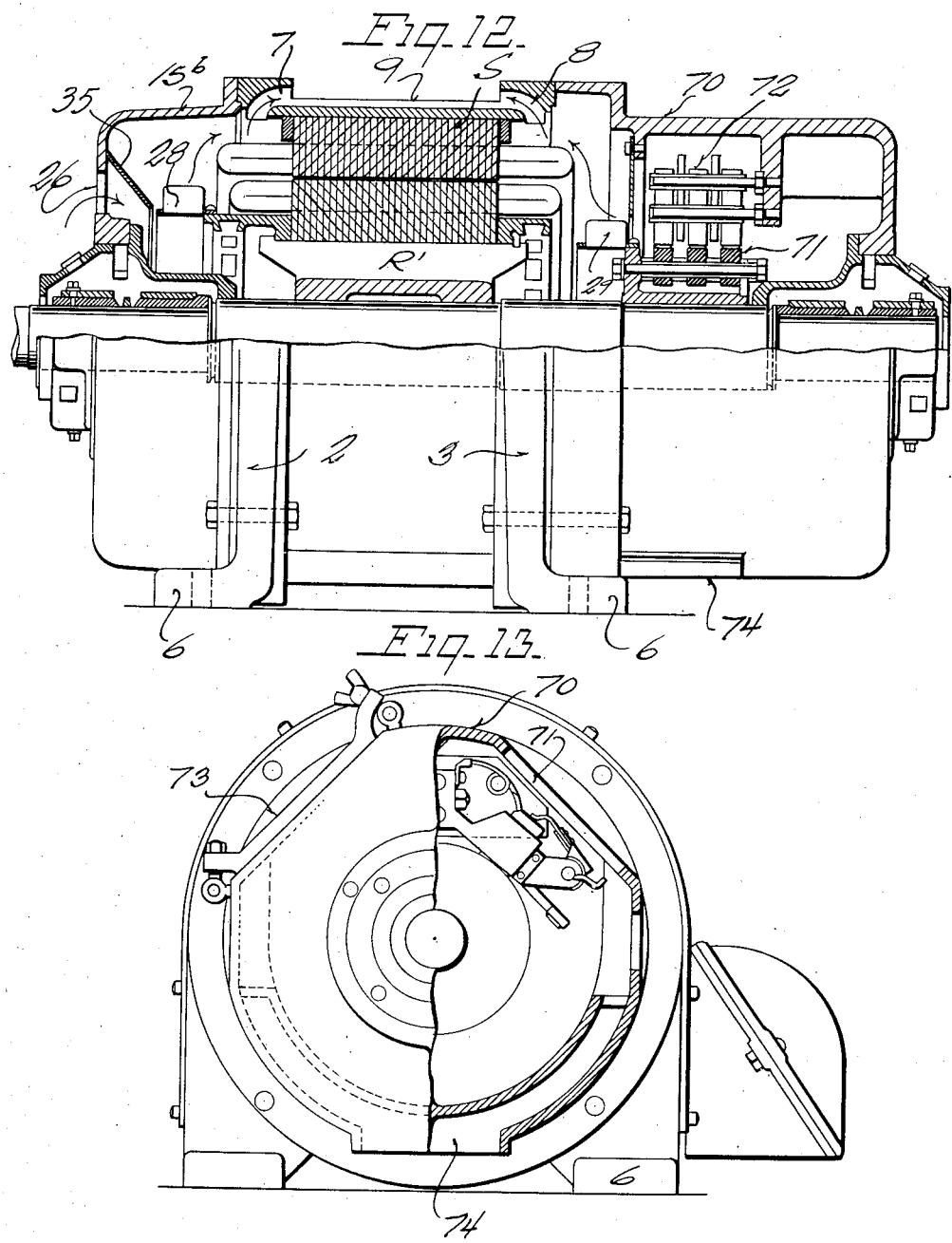

Patented Apr. 19, 1938

2,114,907

UNITED STATES PATENT OFFICE 2,114,907

MOTOR CONSTRUCTION

William J. Oesterlein, Milwaukee, Wis., assignor to Harnischfeger Corporation, Milwaukee, Wis., a corporation of Wisconsin Application May 2, 1935, Serial No. 19,406

3 Claims. (Cl. 172—36)

This invention relates in general to electric motors and more particularly to means for supporting, housing and cooling the operating parts thereof.

One of the objects of the present invention is a motor structure in which the major elements of the frame and housing may be interchangeably used in the various types of motors, as, for example, in the squirrel cage or slip ring type of induction motor and yet the motor structure may be appropriately adapted for the various conditions under which it is used. For instance, the motor may be simply constructed to meet the requirements of ordinary industrial application or may be completely housed and protected where it must withstand the action of an excessive amount of dirt, chemical fumes, moisture or similar destructive agents. Where the motor is enclosed or is of splash-proof construction, provision is made for circulating large quantities of air around the stator windings and laminations and over the frame of the motor to preclude excessive heating of and damage to the stator windings.

Another object of the invention is to provide a motor of this character wherein the stator laminations are organized in a novel and advantageous manner with the stator frame.

A further object of the invention is to provide an electric motor having these advantages and capacities and which is simple, durable and rugged in its construction, easy to assemble and reliable and effective in operation.

Other objects and advantages reside in certain novel features of the construction, arrangement and combination of parts which will be hereinafter more fully described and particularly pointed out in the appended claims, reference being had to the accompanying drawings, forming a part of this specification, and in which:

Figure 1 is a view partly in central vertical longitudinal cross section and partly in elevation showing a squirrel cage motor adapted to meet the requirements of ordinary industrial use and constructed in accordance with the present invention;

Figure 2 is a view in section taken on line 2—2 of Figure 1 and showing the fan structure;

Figure 3 is a view similar to Figure 2 but showing a modified form of fan structure;

Figure 4 is a fragmentary perspective view illustrating the construction of the stator frame embodied in the various forms of the invention;

Figure 5 is a view similar to Figure 1 but showing the invention embodied in a fully enclosed squirrel cage type of motor;

Figure 6 is a view in section taken on line 6—6 of Figure 7;

Figure 7 is a fragmentary sectional view taken on line 7—7 of Figure 5;

Figure 8 is a fragmentary view similar to Figure 7 but showing the slots in the frame prior to the welding of the stator laminations to the walls thereof;

Figure 9 is a fragmentary view similar to Figure 6 but also showing the parts prior to the welding of the stator laminations in position;

Figure 10 is a view similar to Figures 1 and 5 but illustrating the invention embodied in an enclosed squirrel cage motor of the splash-proof type;

Figure 11 is a view partly in end elevation and partly in transverse vertical section further illustrating the motor shown in Figure 10;

Figure 12 is a view partly in side elevation and partly in central vertical longitudinal section illustrating the invention embodied in a slip ring motor adapted to meet the requirements of ordinary industrial use and constructed in accordance with the present invention;

Figure 13 is a view of the motor shown in Figure 12 but illustrating the same partly in elevation and partly in transverse vertical section;

Figure 14 is a view in central longitudinal section showing the invention embodied in a fully enclosed, slip ring type of motor, parts being shown in elevation for the sake of illustration;

Figure 15:
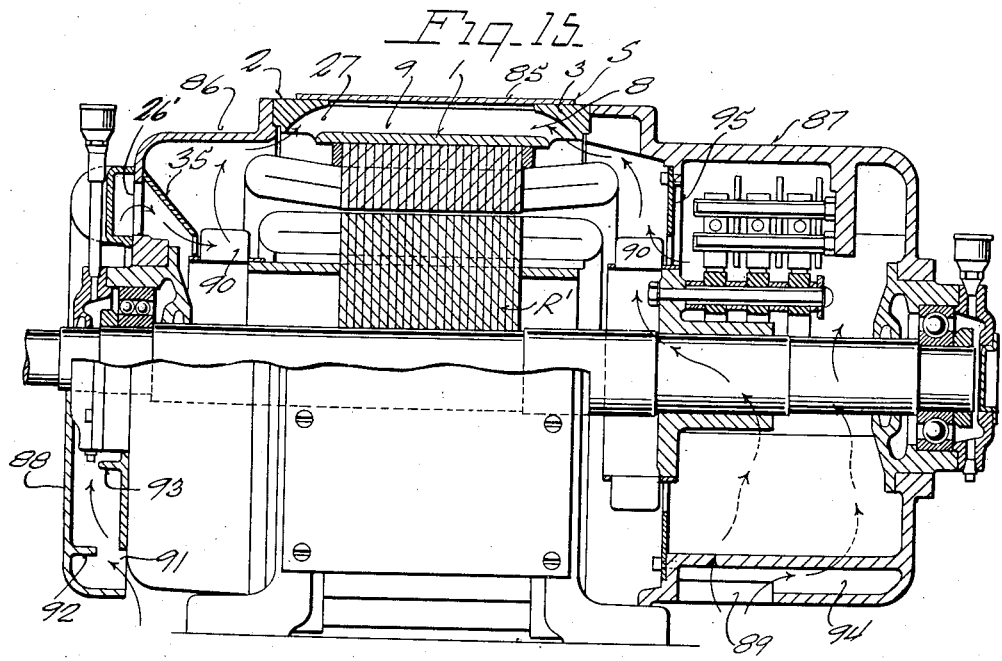
Figure 15 is a view similar to Figure 12 but showing the invention embodied in a splash-proof slip ring motor.

Referring to the drawings, and more particularly to Figures 1 to 4, inclusive, it will be seen that the motor therein shown is made up generally of a stator S and a rotor R. The stator S has a frame and housing of special construction and made up of an annular band-like body 1 and end rings or flanges 2 and 3. The rings 2 and 3 are integrally connected with edge portions of the body 1 by means of integral webs 4 provided at spaced intervals about the circumference of the body. A number of reinforcing ribs 5 may also be provided and are integral with the body 1 and the rings 2 and 3. Integral with the lower portion of the rings 2 and 3 are legs or ground engaging supports 6. The rings 2 and 3 are offset from the body 1 by the webs 4 so as to provide air passages 7 and 8 between the rings and the body. They are also offset outwardly from the body 1 to provide an external channel 9 between the rings and the body.

The stator laminations are designated at 10 and the stator windings at 11. The manner in which the stator laminations are organized with the stator frame is the same in all embodiments of the invention and in considering the following description of this feature Figures 4 and 5 to 9, inclusive, should be referred to. As there illustrated the stator laminations 10 are fitted snugly within the body 1 and are supported thereon. In order to permanently secure the laminations to each other and to the body 1 transverse grooves 12 are provided at spaced intervals in the body 1 and preferably are disposed between opposed webs 4, the ends of the slots terminating just short of the webs. Welds 13 are then formed between the portions of the laminations exposed through the slots 12 and the walls of the slots. During the formation of the welds the laminations are clamped firmly in position by a suitable means which acts on protective or reinforcing rings 14 provided within the body 1 on each side of the laminations.

End heads 15 and 16 are provided and preferably are of the cupped form shown. Flange formations 17 on the end heads are machined or interfit with the end rings 2 and 3 and are secured to said rings by bolts or other similar fastenings 18. At their centers the end heads carry bearing capsules 19 and 19' which are provided with bearings 21 and 22 for the armature or rotor shaft 23. Fixed to this shaft 23 is a laminated rotor 25 which, in the present construction, is of the squirrel cage type.

Air inlet openings 26 and 27 are provided in the end heads 15 and 16 around the bearing capsules.

For the purpose of drawing air in through the openings 26 and 27 and forcing the air so drawn in around the stator windings and laminations and thence over the frame 1 and centrally from the machine, fans 28 and 29 are provided.

The fans 28 and 29 are of similar construction, each being formed from a strip of metal 30 bent into circular form and having blades or air impelling lugs 31 struck therefrom. The blades 31 may be directed inwardly as shown in Figure 2 or may be directed outwardly as indicated at 31' in Figure 3. In either event the attaching portion 32 of each fan fits over and is fastened as at 33 to the rotor rings 44.

Conical deflectors 35 are secured to each end head between its air inlet openings and the adjacent fan so that when the rotor rotates, cooling air is pulled in through the openings 26 and 27, forced past the rotor rings 34 and then over the stator windings and laminations to the air passages 7 and 8. The air flow through the passages 7 and 8 and over the frame 1 and the two oppositely moving currents striking each other in the channel 9 are deflected radially outwardly from the motor.

It will be understood from the foregoing that the motor described is well adapted to advantageously meet the requirements of ordinary industrial use. The outer shell consisting of the stator frame and end heads affords excellent protection for the electrical windings and revolving parts on the inside of the motor, thereby precluding accidental contact of the hand or mechanical injuries from dropping or flying parts. To some extent also the parts of the motor are protected against dripping liquid. Despite the excellent protection afforded by the protective shell cooling and ventilation of the motor is accomplished in an effective manner. The cooling air taken in through the openings of the end heads and guided by the deflector 35 will cool the end rings of the squirrel cage winding before it is discharged by the fans over the ends of the stator winding to the air passages or openings 7 and 8 of the stator frame. After passing through the passages 7 and 8 and while traveling at a high velocity it strikes the outer surface of the body of the frame and absorbs the heat losses of the stator laminations and of the winding embedded in said laminations. The air currents coming from opposite ends of the motor meet in the channel 9 and the tendency is for the air to be thrown outwardly and radially entirely around the motor, thus, preventing return of the warm air to the intakes in the end heads.

In the form of the invention shown in Figures 5 to 9, inclusive, the motor comprises a stator S and rotor R as before. The stator S is substantially identical in construction with that previously described except that the channel 9 is closed by an annular cover plate 40. End heads designated at 15' and 16' are provided, the end head 15' being practically identical with the end head 15 and supporting the capsule 41 for a roller bearing assembly 42 supporting one end of the rotor shaft 23. Within the end head 15' a cup-like inner shell 43 is provided and has one end seated on a flange 44 of the end head 15' and fastened in such position by means of screws 45. The other end of the shell is snugly interfitted as at 45' with the body portion 1 of the stator.

In between the end head 16' and the adjacent part of the stator, an annular carrier 46 is provided and is secured in position by the same bolts that fasten the end head to the frame of the stator. Angularly spaced webs 47 integral with the carrier support an inner shell 48 also integral with the webs and having one end interfitted as at 49 with the frame 1 of the stator and having its other end portion 50 constituted to support the capsule 51 of a roller bearing assembly 52 which, with the roller bearing assembly 41, affords the support for the rotor shaft.

One end of the shaft designated at 53 projects beyond the roller bearing assembly 52 and has a fan 54 fixed thereto. The fan is designed to draw air into the openings 55 of the end head 16' and force such air through a passage 56 formed between the inner shell 48 and the end head 16 and carrier 46. The air then flows on in through the passage 8 through the enclosed channel 9, then through the passages 7 into passage 57 defined between the end head 15' and the inner shell 43. From the passage 57 the air passes out through air outlet openings or ports 58.

The motor illustrated in Figures 5 to 9, inclusive, may be used with special advantage where it is exposed to an excessive amount of dirt, chemical fumes, moisture or similar destructive agents. While completely protected against the deleterious defects of such agents, it is nevertheless constituted to stand up under continuous service and heavy loads. The fan 54 propels a great volume of cool air at high velocity over the inner shells and stator frame and effectively prevents a destructive temperature rise.

In Figures 10 and 11 the invention is shown embodied in a splash-proof motor of the squirrel cage type. In such construction the motor comprises a stator S and rotor R as before. The stator S is substantially identical with that shown in Figure 5 except that the cover plate designated at 40' instead of extending entirely around the frame terminates near the lower portion thereof as indicated at 60. The rotor rings 34 carry fans 28 and 29 as in the form of the invention shown in Figure 1 and cone-shaped deflectors 35 are disposed in cooperative relation to these fans, inner shells such as shown at 43 and 48 in Figure 5 being omitted. However, end heads similar to the end heads 15 and 16 and designated at 15ª and 16ª are provided as before. The end walls of these end heads are protected and enclosed by hoods designated at 61, closed except for air inlet openings 62 provided at their lower ends. These end heads provide air passages 63 leading to the air inlet ports 64 in the end heads. Baffles designated at 65 and 66 are provided within the hoods to prevent water from splashing into the motor.

With this construction the fans 29 draw air in through the air inlet openings 62, pull it through the passages 63 in through the air inlet openings 64. The air then passes down through the deflectors 35, then past the rotor R and the windings and laminations of the stator, then through the passages 7 and 8 into the channel 9. The air flows around through the channel and out under the lower ends of the cover plate 60.

The splash-proof type of squirrel cage motor just described and shown in Figures 10 and 11 is especially adapted for use in locations fairly free of excessive dust and dirt but where the atmosphere is saturated due to dripping or splashing water. These motors may be used advantageously for indoor or outdoor installation and their operating efficiency will not be impaired even when exposed to a driving rain or a stream of water from a hose line. For example, they are particularly adaptable for use in such places as slaughter houses, dairies, distilleries, laundries and the like.

The air intakes are facing the motor ends and cannot be reached by splashing water or overhead streams of water. The baffles on the inside of the hoods prevent the rise of water to the ventilating openings in the end heads. Furthermore, the air exhaust openings or discharge openings being located at the bottom of the frame and protected by the cover plate 40' prevent the entry therethrough of water or moisture. These advantages are had while insuring effective cooling of the motor parts.

The invention may be advantageously embodied in slip ring type of motor adapted for ordinary commercial use in the manner illustrated in Figure 12. As there shown, the motor has a stator designated at S and a rotor designated at R'. The stator S is substantially the same in its mechanical construction as that shown in Figure 1 and it has an end head 15ᵇ similar to the end head 15 of the structure shown in Figure 1. The other end head designated at 70 is made somewhat larger and constituted to house and contain the slip rings 71 and their brushes 72. In this form of the invention the fans 28 are carried by the rotor and the other fans 29 are carried by the slip ring assembly. Only one cone-shaped deflector 35 is employed. With this construction one of the fans 29 draws air in through the openings 26, in through the deflector 35, over the rotor and the windings and laminations of the stator and then out through the openings 7 and channel 9. The other fan 29 pulls the air in through a baffled air inlet 74 in end head 70 and also in through an apertured cover plate 73 of the end head 70, (only one of which is shown in Figure 13) where apertured instead of imperforate cover plates are used. The air is then propelled over the slip ring assembly past the rotor and stator and out through the passages 8 and channel 9. The oppositely moving air currents encounter each other in channel 9 and are deflected radially from the motor as previously described.

Where conditions make it desirable to employ a more completely protected and enclosed type of slip ring motor the construction shown in Figure 14 may be utilized.

In Figure 14 the invention is shown embodied in an enclosed fan cooled motor structure of the slip ring type. As before, the motor comprises a stator S and a rotor R', the stator S being substantially identical with that shown in Figures 5 and 6. To one side of the stator frame is a carrier 46 and end head 16' and within the end head an inner shell 48 is provided, this inner shell being supported on the carrier 46 as before and serving to support the bearing 75 in which the rotor shaft 76 is rotatably supported. A fan 54 is fixed to the shaft 76 and located between the end head 16' and the inner shell 48. To the opposite side of the stator an end head 77 is secured and houses the slip ring assembly 78 and also supports the bearing assembly 79 in which one end of the rotor shaft 76 is supported for rotation. In this form of the invention an inner shell 80 is carried by the end head 77 and is snugly interfitted as at 81 with the body portion 1 of the stator.

In operation the fan 54 forces air over the shell 48 and through the spaces 46' in between the webs which connect the inner shell 48 to the carrier 46. The air then passes through the passages 7, channel 9 and passages 8, to a passage 82, defined between a portion of the end head 77 and the inner shell 80 and thence through ports or openings 83 formed in the end head 77.

Figure 16:
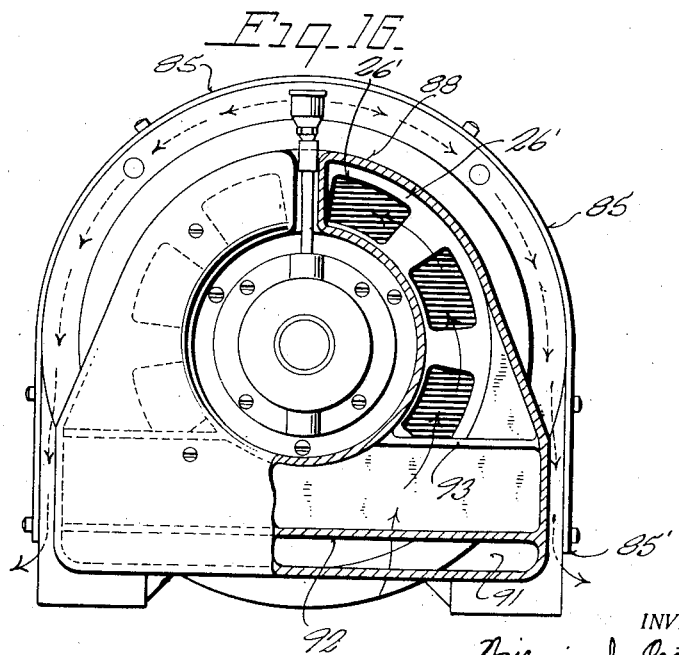
Figure 16 is a view similar to Figure 13 but illustrating the motor shown in Figure 15.

In Figures 15 and 16 the invention is shown embodied in a splash-proof motor structure of the slip ring type. In this embodiment of the invention there is a stator S and rotor R' substantially the same as the corresponding parts in Figures 12 and 13 except that the cover plate 85 applied to the rotor frame is of the type that terminates near the lower end thereof as indicated at 85' instead of extending entirely therearound, as in Figure 14. The stator has end heads 86 and 87 similar to those shown in Figure 14 except that the end head 86 is equipped with a hood 88 and the end head 87 necessarily has a double wall construction in its lower part defining a protected air inlet 89, and that the air discharge openings 83 are omitted in this embodiment. Air circulating fans 90 are mounted on the rotor and slip ring assembly.

The hood 88 is closed except for an air inlet opening at its bottom designated at 91 and above said opening is equipped with baffles 92 and 93.

With this construction, when the motor is running the air is drawn in through the air inlets 89 and 91. The air drawn in through the air inlet 91 is pulled through the hood, through the openings 26' of the end head 86, then in through the deflector 35, past the rotor and stator windings and laminations and in through the openings 7 into the channel 9. Similarly, the air pulled in through the inlet opening 89 by the other fan 90 flows through the air inlet 89 into the passage 94 of the double wall structure of end head 87, over the slip ring assembly, then through apertured plate or shield 95 past the fan and across the windings and laminations of the rotor and stator, through the openings 8 and into the channel 9. The two air currents then flow around the channel 9 over the body of the stator frame and out through the discharge openings presented at the lower ends 85' of the cover plate 85.

As shown in the drawings, the welds 13 do not completely fill the slots or grooves 12 but the portion thereof not occupied by the welds may be filled up with a suitable filling composition, if desired.

It will be understood from the foregoing that the stator frame and, to a large extent, the end heads may be interchangeably used in various types of motors. In other words, a minimum number of special parts is required for each type of motor.

While I have shown and described a number of constructions in which the invention may be advantageously embodied, it is to be understood that the constructions illustrated have been selected merely for the sake of example and that various changes in the size, shape and arrangement of the parts may be made without departing from the spirit of the invention or the scope of the subjoined claims.

The invention claimed is:

1. A motor comprising a frame, stator windings and laminations carried by the inside of the frame, said frame having passages extending transversely therethrough, end heads connected to said frame, a rotor in cooperative relation to said windings and laminations, inner shells coacting with said end heads and said frame for defining passages communicating with the transverse passages of the frame and with the exterior through said end heads, a carrier interposed between one of said end heads and said frame and connected to the adjacent inner shell for supporting the same, said last-named inner shell having a bearing for supporting the rotor.

2. An electric motor comprising a frame, stator windings and laminations carried by the inside of the frame, said frame having an annular passage therein and also having passages extending transversely therethrough from both sides of said annular passage, a rotor shaft, a rotor mounted on the shaft in cooperative relation to said stator windings and laminations, a pair of end heads, a carrier ring interposed between one of said end heads and said frame, means for releasably securing the end heads and the carrier ring to the frame, inner shells interfitted with the stator frame and the end heads to completely enclose the rotor and stator windings and laminations and to coact with the frame and the end heads to define passages communicating with the transverse passages of the frame and with the exterior through said end heads, one of said inner shells being supported on its end head, the other of said inner shells being supported on said carrier ring, a bearing for the shaft mounted on said last-mentioned inner shell, a second bearing for the shaft supported on the end head remote from said last-mentioned inner shell, and a fan for circulating air through said passages, said fan being secured to the shaft and being positioned in the space between the last-mentioned shell and the adjacent end head.

3. A motor comprising a frame, stator windings and laminations carried by the inside of the frame, said frame comprising an annular band-like body, end rings slightly larger than the body and offset slightly laterally from the side edges of the body, webs connecting the end rings with the body, said end rings coacting with the body to define an exterior annular channel, transverse passages between the channel and the interior of the frame, a band detachably connected to the rings and covering the channel, a rotor shaft, a rotor mounted on said shaft in cooperative relation to said stator windings and laminations, a pair of end heads, a carrier ring interposed between one of said end heads and one of the rings of said frame, means releasably securing the end heads and the carrier ring to the stator frame, inner shells interfitted with the stator frame and the end heads to completely enclose the rotor and the stator windings and laminations, said inner shells also coacting with the end heads and the frame to define passages communicating with the transverse passages of the frame and with the exterior through said end heads, one of said inner shells being supported on its adjacent end head, the other of said inner shells being supported on said carrier ring, a bearing for the rotor shaft carried on said last-mentioned inner shell, a second bearing for the shaft supported on the end head remote from said last-mentioned inner shell, and a fan fixed to the rotor shaft and disposed in the space between said last-mentioned inner shell and its adjacent end head.

WILLIAM J. OESTERLEIN.